(12) United States Patent
Hilemon et al.

(10) Patent No.: US 10,311,399 B2
(45) Date of Patent: Jun. 4, 2019

(54) APPARATUS AND METHOD FOR MAINTAINING MULTI-REFERENCED STORED DATA

(71) Applicant: Computational Systems, Inc., Knoxville, TN (US)

(72) Inventors: Christopher G. Hilemon, Knoxville, TN (US); Anthony J. Hayzen, Knoxville, TN (US); William L. Sells, Knoxville, TN (US); Viva C. Williams, Knoxville, TN (US); David A. Bass, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 350 days.

(21) Appl. No.: 15/343,799

(22) Filed: Nov. 4, 2016

(65) Prior Publication Data

US 2017/0236089 A1    Aug. 17, 2017

Related U.S. Application Data

(60) Provisional application No. 62/294,492, filed on Feb. 12, 2016.

(51) Int. Cl.
    *G06Q 10/08*    (2012.01)
(52) U.S. Cl.
    CPC ................... *G06Q 10/087* (2013.01)
(58) Field of Classification Search
    USPC .......................................................... 705/28
    See application file for complete search history.

(56) References Cited

U.S. PATENT DOCUMENTS

| | | | | |
|---|---|---|---|---|
| 5,604,892 A * | 2/1997 | Nuttall | ................ | G06F 17/50 703/18 |
| 6,289,299 B1 * | 9/2001 | Daniel, Jr. | ......... | G05B 23/0216 345/419 |
| 6,421,571 B1 * | 7/2002 | Spriggs | ................ | G05B 15/02 345/629 |
| 6,650,346 B1 * | 11/2003 | Jaeger | ................ | G06Q 10/00 715/764 |
| 6,847,922 B1 * | 1/2005 | Wampler, II | ....... | G05B 19/4069 700/251 |
| 7,194,446 B1 * | 3/2007 | Bromley | ............ | G05B 19/0423 706/12 |
| 7,689,394 B2 * | 3/2010 | Furem | ................ | E02F 9/2054 703/8 |

(Continued)

*Primary Examiner* — Ashford S Hayles
(74) *Attorney, Agent, or Firm* — Luedeka Neely Group, P.C.

(57) ABSTRACT

A system collects and manages sets of asset data that are indicative of operational performance of physical assets disposed at multiple physical locations in a plant. The system includes a database that associates each set of asset data to (1) a location at which the data was collected, (2) the asset for which the data was collected, and (3) the monitoring device that was used to collect the data. In this way, each location has its own history of all asset data ever collected on all assets disposed at that location, and its own history of all monitoring devices used to collect data at that location. Also, each asset has its own history of all asset data collected on that asset at all locations at which it was disposed and for all monitoring devices. This sort of asset data is referred to herein as multi-referenced data.

18 Claims, 5 Drawing Sheets

(56) References Cited

U.S. PATENT DOCUMENTS

| | | | | |
|---|---|---|---|---|
| 7,774,268 B2* | 8/2010 | Bradley | G06K 17/00 | 705/38 |
| 8,009,165 B2* | 8/2011 | Reichard | G06T 19/00 | 345/419 |
| 8,061,604 B1* | 11/2011 | Wobbe | G06Q 10/20 | 235/385 |
| 8,380,842 B2* | 2/2013 | Bates | H04L 41/0226 | 709/224 |
| 9,613,233 B1 | 4/2017 | Landon | G06Q 10/20 | |
| 9,641,964 B2* | 5/2017 | Kulkarni | H01Q 1/24 | |
| 10,055,529 B1* | 8/2018 | Ginetti | G06F 17/5081 | |
| 2003/0004656 A1* | 1/2003 | Bjornson | G05B 23/0278 | 702/34 |
| 2003/0004925 A1* | 1/2003 | Knoblock | G06Q 10/06 | |
| 2003/0154199 A1* | 8/2003 | Thomas | G06F 9/4451 | |
| 2003/0171969 A1* | 9/2003 | Morin | G06Q 40/00 | 705/35 |
| 2004/0203930 A1* | 10/2004 | Farchmin | G01S 5/0252 | 455/457 |
| 2004/0215533 A1* | 10/2004 | Doeberl | G06Q 40/02 | 705/30 |
| 2006/0067286 A1* | 3/2006 | Cornett | G01S 1/68 | 370/338 |
| 2006/0173619 A1* | 8/2006 | Brant | G01S 5/02 | 701/50 |
| 2006/0259634 A1* | 11/2006 | Hood | G05B 19/056 | 709/230 |
| 2007/0142941 A1* | 6/2007 | McGreevy | G06Q 10/00 | 700/83 |
| 2007/0250180 A1* | 10/2007 | Bump | G05B 19/41845 | 700/1 |
| 2007/0293151 A1* | 12/2007 | Mullen | G06Q 10/087 | 455/39 |
| 2008/0077512 A1* | 3/2008 | Grewal | G05B 19/05 | 705/28 |
| 2008/0077617 A1* | 3/2008 | Schulz | G06Q 10/06 | |
| 2009/0088870 A1* | 4/2009 | Baier | G05B 19/41865 | 700/28 |
| 2012/0254792 A1* | 10/2012 | Husoy | G06F 3/0481 | 715/782 |
| 2013/0191106 A1* | 7/2013 | Kephart | G05B 17/02 | 703/21 |
| 2013/0246026 A1* | 9/2013 | Ceglia | G05B 17/02 | 703/6 |
| 2013/0290899 A1* | 10/2013 | Amran | G06F 3/0488 | 715/810 |
| 2013/0290908 A1* | 10/2013 | Macura | G06T 17/00 | 715/850 |
| 2014/0208214 A1* | 7/2014 | Stern | H04L 41/22 | 715/734 |
| 2014/0214801 A1* | 7/2014 | Ciliberti, III | G06Q 10/0631 | 707/722 |
| 2015/0077263 A1* | 3/2015 | Ali | G05B 23/0216 | 340/679 |
| 2015/0081887 A1* | 3/2015 | Kalkunte | H04L 43/0852 | 709/224 |
| 2015/0185718 A1* | 7/2015 | Tappan | G05B 15/02 | 700/83 |
| 2015/0187137 A1* | 7/2015 | Mullins | G06T 19/006 | 345/633 |
| 2015/0187138 A1* | 7/2015 | Mullins | G06T 19/006 | 345/633 |
| 2015/0336274 A1* | 11/2015 | Connell, II | G06F 16/51 | 700/259 |
| 2015/0346942 A1* | 12/2015 | Oren | G06F 16/26 | 715/769 |
| 2016/0004694 A1* | 1/2016 | Cornaby | G06F 16/51 | 715/734 |
| 2016/0042310 A1* | 2/2016 | Yanez Mendez | G06Q 10/087 | 705/28 |
| 2016/0049005 A1* | 2/2016 | Mullins | G06T 19/006 | 345/420 |
| 2016/0132838 A1* | 5/2016 | Grossman | G06Q 10/00 | 705/305 |
| 2016/0154913 A1* | 6/2016 | Altare | G06Q 10/06 | 703/13 |
| 2016/0179987 A1* | 6/2016 | Walle | G06F 17/50 | 703/1 |
| 2016/0284128 A1* | 9/2016 | Michalscheck | G06T 19/006 | |
| 2016/0292895 A1* | 10/2016 | Billi | G06T 11/60 | |
| 2017/0038916 A1* | 2/2017 | Beach | G06F 16/9535 | |
| 2017/0235292 A1* | 8/2017 | Wernersbach | G05B 19/0428 | 700/81 |
| 2017/0293418 A1* | 10/2017 | Hams | G06F 3/04845 | |

* cited by examiner

APPARATUS AND METHOD FOR MAINTAINING MULTI-REFERENCED STORED DATA

This nonprovisional patent application claims priority to provisional patent application Ser. No. 62/294,492 filed Feb. 12, 2016, titled MAINTAINING MULTI-REFERENCED STORED DATA, the content of which is incorporated by reference herein in its entirety.

FIELD

This invention relates to the field of collection and storage of data indicating an operational condition of a machine or other asset. More particularly, this invention relates to a system for storing asset data in association with an identifier for the asset and the location of the asset within a plant.

BACKGROUND

In a manufacturing plant or other facility in which it is desirable to monitor the operational condition of machines and other assets, machine performance data is typically collected and stored in a database. A longstanding limitation of storing machine data in a database has been that the data is typically stored only in association with plant hierarchy nodes, such as machine nodes that identify machine locations within the plant. As a result, if a machine is moved to another location in the plant hierarchy, the data collected for that machined continues to be associated only with the original location. Thus, the data did not follow the machine to its new location in the plant.

What is needed, therefore, is a method for associating asset performance data with (1) the location of the asset at the time the data was collected and (2) the actual asset itself, such that, if an asset is moved to a new location, the data is referenced both to the old location and to the asset.

SUMMARY

In a typical organizational hierarchy of a plant, there are multiple locations and multiple assets. As the term is used herein, a "location" refers to a particular physical place in the plant at which an asset is or was disposed. As the term is used herein, an "asset" is a machine or a monitoring device for making measurements indicating the condition or performance of a machine. Using vibration data as an example, a vibration waveform signal measured on a particular machine is dependent not only on the characteristics of the machine, but also on the physical location of the machine in the plant. External influences on the vibration signal could be caused by poor machine mounting in the plant (soft foot) or by vibration picked up from adjacent machines. The end result is that the vibration data is a function of the machine and the machine's location.

When a machine such as a motor requires maintenance, it is typically removed from its location and replaced by another similar motor while it is being repaired in a workshop. The repaired motor may then be placed in storage and eventually moved to some other location in the plant. From a vibration analyst's point of view, it would be very helpful to view the history of all the data collected on this motor, from all locations in which it was installed the past, to see if there are any inherent characteristics of this particular motor that should be taken into consideration during analysis. Conversely, the ability to observe all of the historical data associated with the machine's current location can give insights as to expected behavior of the machine.

Preferred embodiments of the invention described herein provide a database system that associates each set of asset data to (1) a location at which the set of data was collected, (2) the asset for which the set of data was collected, and (3) the monitoring device that was used to collect the set of data. In this way, each location has its own history of all asset data ever collected on all assets disposed at that location, and its own history of all monitoring devices used to collect data at that location. Also, each asset has its own history of all asset data collected on that asset at all locations at which it was disposed and for all monitoring devices. Additionally, each monitoring device has its own history of all asset data collected by the monitoring device, for all assets it monitored and for all locations in which it collected data. This sort of asset data is referred to herein as multi-referenced data.

Multi-referenced data typically applies to a unique location identifier, a unique physical asset identifier, and a unique monitoring device identifier. However, various embodiments are not limited to just location, asset, and monitoring device, but are also applicable to data referenced by more than three identifiers, which may be other than location, asset, and monitoring device. Further, embodiments are not limited to one-to-one relationships. For example, a particular monitoring device may monitor more than one asset at the same time.

Some preferred embodiments described herein are directed to an asset data collection and management system comprising a plurality of physical assets, a plurality of monitoring devices, an asset data management computer, and a database. The physical assets, which are disposed at a plurality of physical locations in a plant, are each assigned a unique asset identifier. The monitoring devices collect sets of asset data that are indicative of the operational performance of the physical assets. Each monitoring device is assigned a unique monitoring device identifier.

The asset data management computer, which is in communication with the monitoring devices via a communication network, receives the sets of asset data and executes various software instructions to manage the asset data. The software instructions generate a plurality of location placeholders that are each associated with a unique one of the plurality of physical locations in the plant, and the instructions associate the unique asset identifiers with corresponding location placeholders. The association of a unique asset identifier to a location placeholder indicates that a physical asset to which the unique asset identifier is assigned is disposed at the physical location associated with the location placeholder.

In some preferred embodiments, the software instructions also bind the unique monitoring device identifiers to corresponding location placeholders. The binding of a unique monitoring device identifier to a location placeholder creates an association between the location placeholder and the unique monitoring device identifier.

Additionally, the software instructions cause each of the sets of asset data to be stored in association with a unique asset identifier and a location placeholder. In some embodiments, each of the sets of asset data is also stored in association with a unique monitoring device identifier. The unique asset identifier identifies the physical asset for which a stored set of asset data was collected. The location placeholder indicates the physical location at which the stored set of asset data was collected. The unique monitoring device identifier uniquely identifies a monitoring device that collected the stored set of asset data.

Asset data stored in the database may be accessed based on at least two associations, and in some embodiments based on three associations. For example, all sets of asset data collected at a particular physical location may be accessed for all physical assets ever disposed at that particular physical location, and all sets of asset data collected for a particular physical asset may be accessed for all physical locations at which the particular physical asset was ever disposed. In some embodiments, all sets of asset data collected using a particular monitoring device may be accessed for all physical assets for which the particular monitoring device ever collected asset data, and at all physical locations at which the particular monitoring device ever collected asset data.

In some embodiments, the plurality of physical assets comprise machines and monitoring devices.

In some embodiments, the monitoring devices comprise permanently installed monitoring devices, or portable handheld monitoring devices, or a combination of permanently installed monitoring devices and portable handheld monitoring devices.

In some embodiments, the system includes sensors attached to the machines, and the monitoring devices collect the sets of asset data based on signals generated by the sensors.

In some embodiments, the asset data management computer executes instructions that generate graphical representations of an asset inventory hierarchy, a location hierarchy and a network hierarchy on a display device. The asset inventory hierarchy comprises a hierarchal display of graphical representations of the physical assets. The location hierarchy comprises a hierarchal display of the physical locations in the plant in which physical assets are located, including graphical representations of the location placeholders associated with the physical locations. The network hierarchy comprises a hierarchal display of graphical representations of the monitoring devices connected to the communication network. In various embodiments described herein, a graphical representation may comprise one or more graphical elements, or one or more textual elements, or a combination of one or more graphical elements and one or more textual elements.

In some embodiments, the asset data management computer executes instructions that associate the unique asset identifier of a particular physical asset with a particular location placeholder based on dragging and dropping the graphical representation of the particular physical asset in the asset inventory hierarchy onto the graphical representation of the particular location placeholder in the location hierarchy.

In some embodiments, the asset data management computer executes instructions that bind the unique monitoring device identifier of a particular monitoring device with a particular location placeholder based on dragging and dropping the graphical representation of the particular monitoring device in the network hierarchy onto the graphical representation of the particular location placeholder in the location hierarchy.

In another aspect, embodiments of the invention provide methods for collecting and managing asset data. A preferred embodiment includes the steps of:

assigning a unique asset identifier to each of a plurality of physical assets disposed at a plurality of physical locations in a plant;

assigning a unique monitoring device identifier to each of a plurality of monitoring devices that collect sets of asset data indicative of operational performance of the plurality of physical assets;

connecting the plurality of monitoring devices to a communication network;

generating a plurality of location placeholders, wherein each location placeholder is associated with a unique one of the plurality of physical locations in the plant;

associating the unique asset identifiers with corresponding location placeholders, wherein association of a unique asset identifier to a location placeholder indicates that a physical asset to which the unique asset identifier is assigned is disposed at the physical location associated with the location placeholder;

binding the unique monitoring device identifiers to corresponding location placeholders, wherein the binding of a unique monitoring device identifier to a location placeholder creates an association between the location placeholder and the unique monitoring device identifier;

storing each of the sets of asset data in association with at least one of the unique asset identifiers, one of the location placeholders, and one of the unique monitoring device identifiers, wherein the unique asset identifier identifies the physical asset for which a set of asset data was collected, wherein the location placeholder is uniquely associated with a physical location at which the set of asset data was collected, and the unique monitoring device identifier uniquely identifies a monitoring device that collected the set of asset data;

providing access to all sets of asset data collected at a particular physical location, for all physical assets disposed at that particular physical location, and collected by all monitoring devices used at that particular physical location;

providing access to all sets of asset data collected for a particular physical asset, for all physical locations at which the particular physical asset was disposed, and for all monitoring devices that collected data for the particular physical asset; and providing access to all sets of asset data collected using a particular monitoring device, for all physical assets for which the particular monitoring device collected asset data, and at all physical locations at which the particular monitoring device collected asset data.

Some embodiments also include:

generating a graphical representation of an asset inventory hierarchy comprising a hierarchal display of graphical representations of the physical assets;

generating a graphical representation of a location hierarchy comprising a hierarchal display of the physical locations in the plant in which physical assets are located, including graphical representations of the location placeholders associated with the physical locations; and generating a graphical representation of a network hierarchy comprising a hierarchal display of graphical representations of the monitoring devices connected to the communication network, wherein a graphical representation may comprise one or more graphical elements, or one or more textual elements, or a combination of one or more graphical elements and one or more textual elements.

In some embodiments, the step of associating the unique asset identifier of a particular physical asset with a particular location placeholder is based on dragging and dropping the graphical representation of the particular physical asset in the asset inventory hierarchy onto the graphical representation of the particular location placeholder in the location hierarchy.

In some embodiments, the step of binding the unique monitoring device identifier of a particular monitoring device with a particular location placeholder is based on dragging and dropping the graphical representation of the particular monitoring device in the network hierarchy onto the graphical representation of the particular location placeholder in the location hierarchy.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
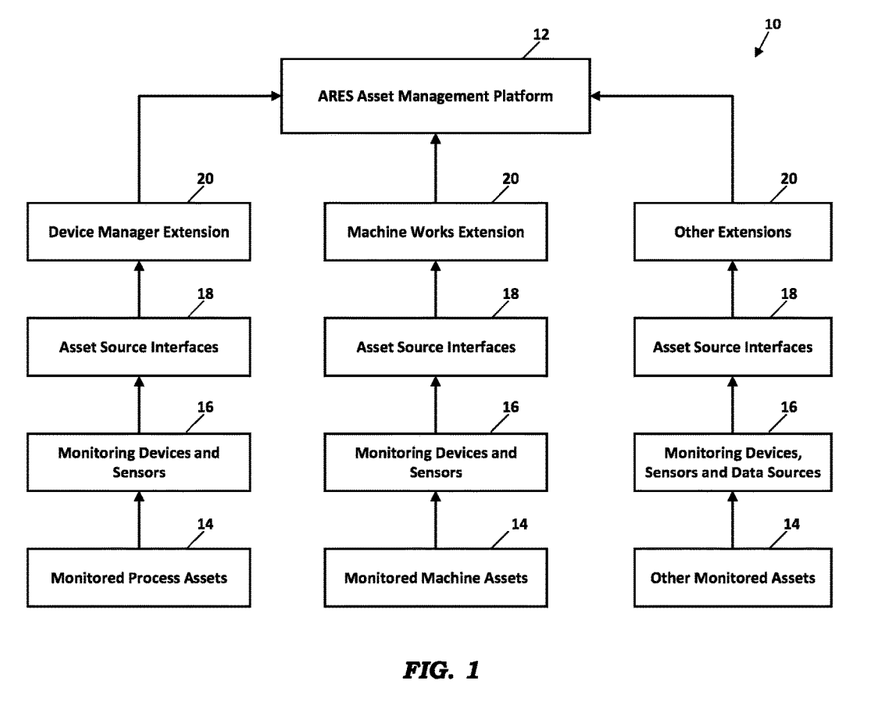
FIG. 1 depicts an asset management platform of an asset data collection and management system according to an embodiment of the invention.

FIG. 1 provides a general overview of an asset data collection and management system 10 in which an asset management software platform 12 manages the storage of asset data collected while monitoring the performance of various assets 14. The asset data is generated by monitoring devices 16 that are used on or near the monitored assets 14. The asset data is communicated across a communication network through asset source interfaces 18 configured with various asset extensions 20. Various embodiments of the invention described herein may operate within the exemplary system 10 depicted in FIG. 1. However, it will be appreciated that the invention could be applied in other types of data collection systems having other configurations.

Figure 2:
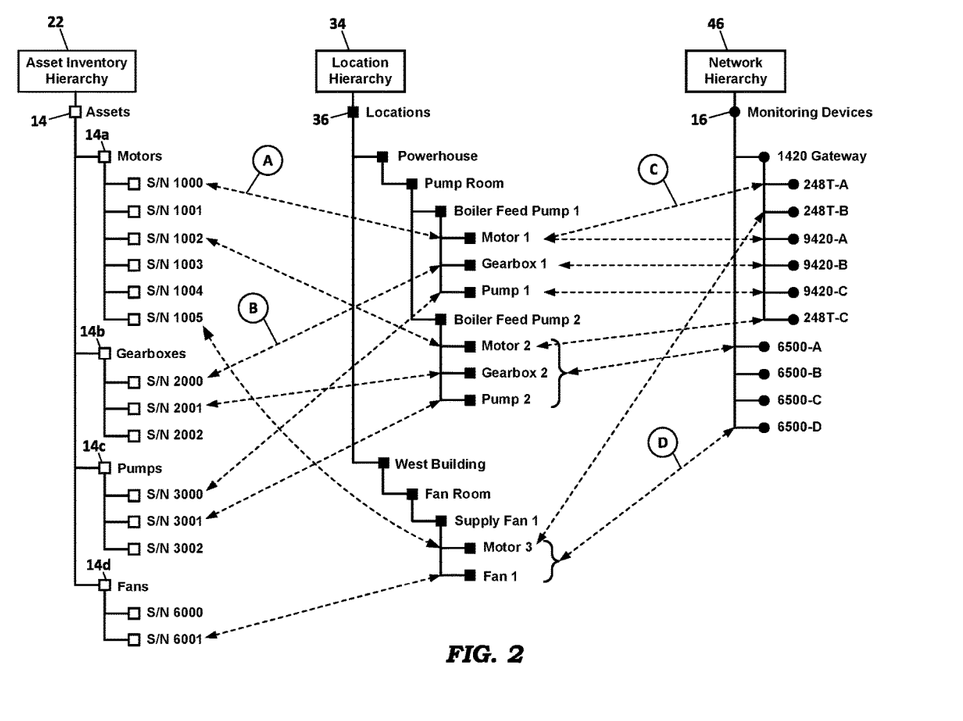
FIG. 2 depicts an inventory hierarchy, location hierarchy and network hierarchy of an asset data collection and management system according to an embodiment of the invention.

As shown in FIG. 2, a preferred embodiment of the asset data collection and management system 10 includes an Asset Inventory Hierarchy 22, a Location Hierarchy 34, and a Network Hierarchy 46.

The Asset Inventory Hierarchy 22 is a virtual representation of all physical assets 14 in the asset data collection and management system 10, including monitored machines and monitoring devices. For example, the monitored machines may include motors 14a, gearboxes 14b, pumps 14c and fans 14d. In the preferred embodiment, each physical asset in the Asset Inventory Hierarchy 22 is represented by an individual block and has a unique identifier, such as a serial number (S/N 1000, S/N 2000, etc.) or a tag number.

The Location Hierarchy 34 is a virtual representation of all physical locations 36 in which monitored assets are located. Within the preferred embodiment of the Location Hierarchy 34 are location placeholders that may be represented by solid squares. Each location placeholder represents a physical location where an asset is disposed, such as Boiler Feed Pump 1 disposed in the Pump Room within the Powerhouse. A specific instance of a unique physical asset is associated with each location placeholder. For example, as indicated by the arrow A in FIG. 2, the physical asset Motor S/N 1000 is associated with the location placeholder Motor 1, and as indicated by arrow B, the physical asset Gearbox S/N 2000 is associated with the location placeholder Gearbox 1.

The Network Hierarchy 46 is a virtual representation of all monitoring devices 16 used to monitor physical assets in the asset data collection and management system 10. The monitoring devices 16 collect data from sensors that are placed on or near the physical assets being monitored. As shown in FIG. 2, an exemplary Network Hierarchy 46 of monitoring devices may include an Emerson 1420 Smart Wireless Gateway 16a that provides wireless communications for three wireless temperature transmitters (248T-A, 248T-B and 248T-C) and three CSI 9420 wireless vibration transmitters (9420-A, 9420-B and 9420-C). The Network Hierarchy 46 may also include four CSI 6500 machinery health monitors (6500-A, 6500-B, 6500-C and 6500-D). Each monitoring device 16 preferably has a unique identifier, such as a serial number associated with it. In a preferred embodiment, all of the monitoring devices 16 are assets that are included in the Asset Inventory Hierarchy 22.

In the preferred embodiment, each of the monitoring devices 16 in the Network Hierarchy 46 is mapped to a location placeholder in the Location Hierarchy 34. For example, as indicated by arrow C in FIG. 2, the wireless temperature transmitter 248T-A is mapped to the location placeholder Motor 1, and as indicated by arrow D, the machinery health monitor mapped to the location placeholders Motor 3 and Fan 1.

Figure 3:
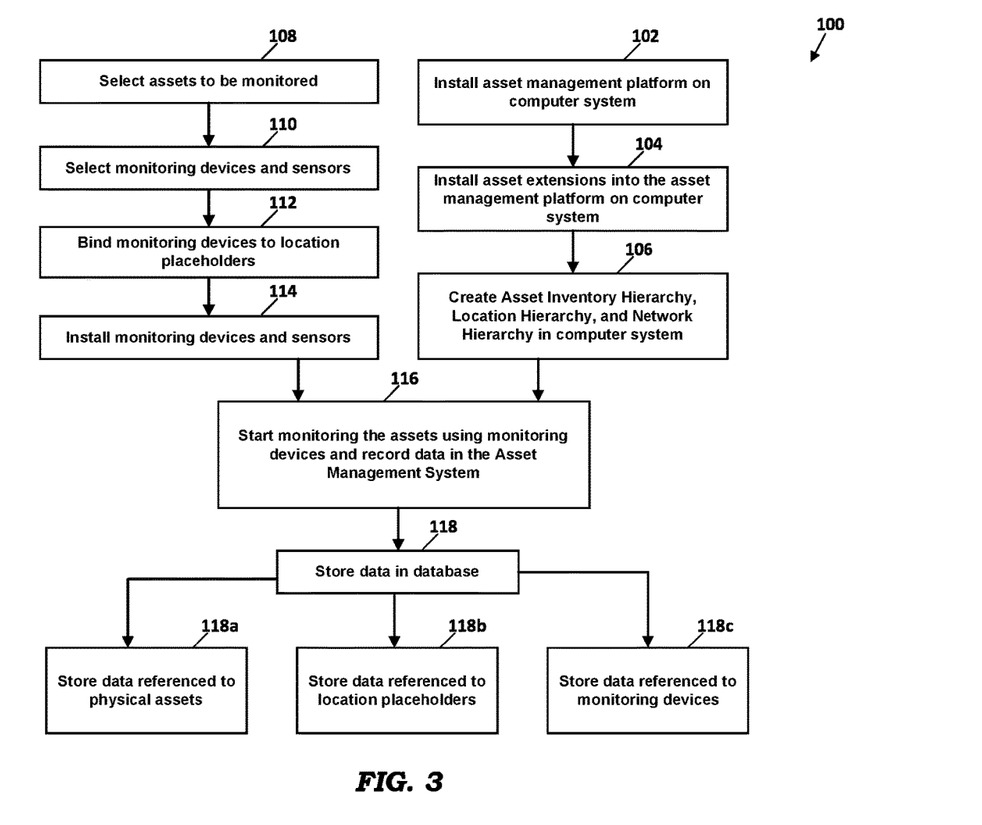
FIG. 3 depicts a method for acquiring and storing asset data according to an embodiment of the invention.

FIG. 3 depicts a process 100 for acquiring and storing asset data according to an embodiment of the invention. Initially, the asset management platform (12 in FIG. 1) is installed on the asset management computer system (24 in FIG. 4A)(step 102), and the asset extensions 20 are installed into the asset management platform 12 (step 104). The asset inventory hierarchy 22, location hierarchy 34, and network hierarchy 46 (such as represented in FIG. 2) are then created in the asset management computer system 24 (step 106).

After installing and setting up the asset management platform 12, the assets to be monitored are selected (step 108) and the monitoring devices and sensors to be used in monitoring the selected assets are selected (step 110). In a preferred embodiment, the selections are a drag-and-drop processes implemented in the asset management platform 12, wherein a graphical representation of an asset 14 in the asset inventory hierarchy 22 (FIG. 2) on a display device is clicked on and dragged and dropped onto a graphical representation of a placeholder in the location hierarchy 34. Similarly, a monitoring device 16 may be selected by dragging and dropping a graphical representation of a monitoring device from the network hierarchy 46 onto a graphical representation of a placeholder in the location hierarchy 34.

After selecting the monitoring devices, the next step is to bind the selected devices to location placeholders in the location hierarchy 34 (step 112). As the term is used herein, "binding" is associating a unique monitoring device identifier that has been assigned to a monitoring device to a physical location in the plant at which the monitoring device is installed. In some embodiments, the binding of step 112 comprises associating the monitoring devices across domains—from the network domain to the physical domain. In a preferred embodiment, the binding process occurs automatically and is initiated by the drag-and-drop selection process (step 110) described above.

Each selected monitoring device and its sensor(s) are then installed on the physical asset associated with the location placeholder that is bound to the selected monitoring device (step 114). In an alternative embodiment, the installation of monitoring devices (step 114) may take place prior to the selection and binding steps.

After completion of steps 102 through 114, the asset data collection and management system 10 is ready to begin monitoring the selected assets using the installed monitoring devices (step 116). As asset data is collected, or soon thereafter, it is stored in the database 48 (step 118). In the preferred embodiment, the data is stored in association with the unique identifier of the physical asset for which the data was collected (step 118*a*), in association with the location placeholder with which the physical asset is associated (step 118*b*), and in association with the unique identifier of the monitoring device that collected the data (step 118*c*).

Thus, in the preferred embodiment, all asset data is associated with (a) the monitoring device that collected the data, (b) the location placeholder representing the physical location in the plant where the asset is disposed, and (c) the physical asset being monitored. The asset data may be stored in separate databases that each references the appropriate physical asset, the location placeholder, or the monitoring device. Alternatively, the asset data may be stored in a relational database, in which case there may be only a single instance of each data value that has references to the physical asset, the location placeholder, and the monitoring device.

In some embodiments, asset data may also be manually entered into the database 48. In some embodiments, external computer systems may also be sources of data for input into the database 48.

Figure 4A:
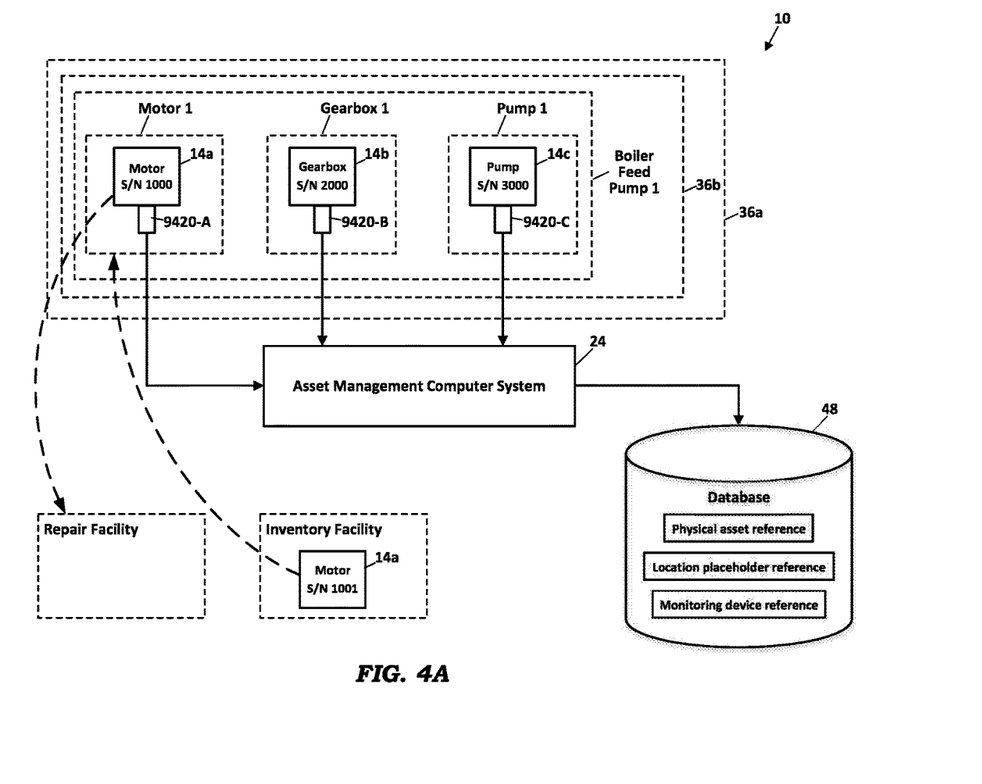
FIGS. 4A and 4B depict an asset data collection and management system according to an embodiment of the invention.
Figure 4B:
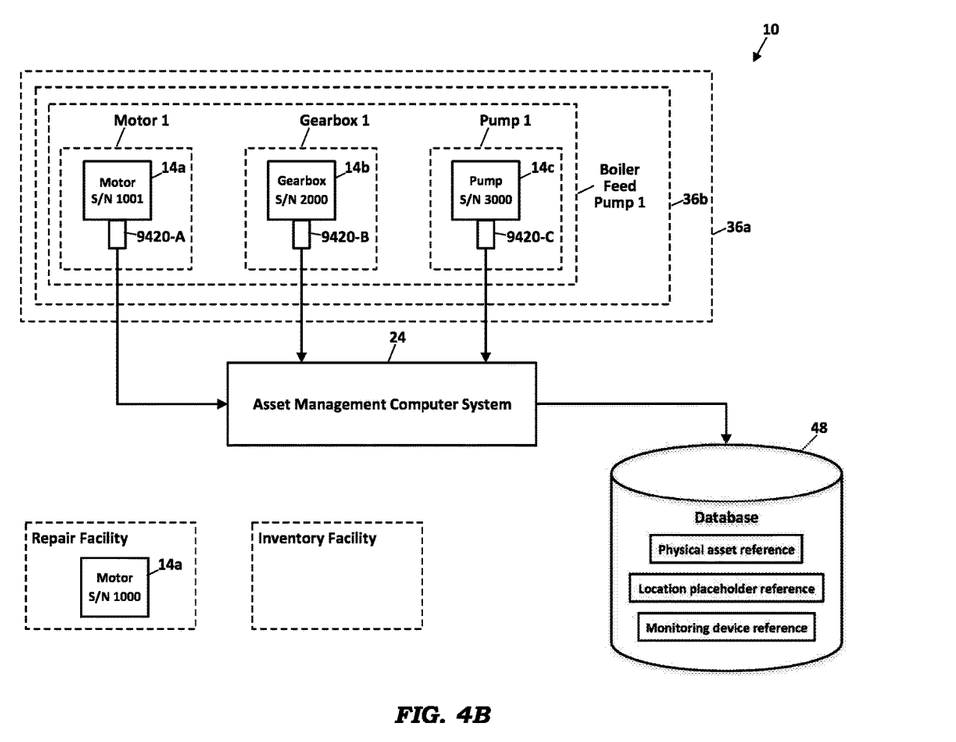

A functional block diagram of the asset data collection and management system 10 is depicted in FIGS. 4A and 4B. As shown in FIG. 4A, the system 10 includes the asset management computer system 24 receiving data from multiple monitoring devices 16, such as wireless vibration transmitters 9420-A, 9420-B and 9420-C, that are monitoring performance parameters of multiple assets, such as a motor 14*a* having a unique identifier Motor S/N 1000, a gearbox 14*b* having a unique identifier Gearbox S/N 2000, and a pump 14*c* having a unique identifier Pump S/N 3000. The assets 14*a*-14*c* are associated with location placeholders Motor 1, Gearbox 1 and Pump 1, respectively. The monitoring devices having unique identifiers 9420-A, 9420-B, and 9420-C are bound to the same location placeholders.

The asset management computer system 24 transfers the asset data to the database 48, where each set of data is stored in association with a unique physical asset reference, a unique location placeholder reference and a unique monitoring device reference. For example, asset data for the motor 14*a* is stored in association with the asset unique identifier Motor S/N 1000, the location placeholder Motor 1, and the monitoring device unique identifier 9420-A. Asset data for the gearbox 14*b* is stored in association with the asset unique identifier Gearbox S/N 2000, the location placeholder Gearbox 1, and the monitoring device unique identifier 9420-B. The asset data for the pump 14*c* is stored in association with the asset unique identifier Pump S/N 3000, the location placeholder Pump 1, and the monitoring device unique identifier 9420-C.

As shown in FIG. 4A, a motor 14*a* having an asset unique identifier Motor S/N 1001 is initially disposed in a plant inventory facility, and the motor 14*a* having an asset unique identifier Motor S/N 1000 is initially disposed at the physical location in the plant associated with location placeholder Motor 1. Based on data collected for Motor S/N 1000, it is determined that it requires repair. As a result, Motor S/N 1000 is removed from the physical location in the plant associated with location placeholder Motor 1 and it is placed in a repair facility in the plant. Motor S/N 1001 is removed from the inventory facility and is installed at the physical location in the plant associated with the location placeholder Motor 1 to replace Motor S/N 1000.

As shown in FIG. 4B, after the changeover, asset data collected for the motor 14*a* installed at the physical location associated with the location placeholder Motor 1 is stored in association with the asset unique identifier Motor S/N 1001, the location placeholder Motor 1, and the monitoring device unique identifier 9420-A. Thus, after the changeover, asset data may be present in the database 48 for two different motors 14*a*-Motor S/N 1000 and Motor S/N 1001—which data is associated with the location placeholder Motor 1 and the monitoring device unique identifier 9420-A.

Associating data with a location placeholder provides several benefits. As various assets are moved in and out of a location in the plant associated with a particular placeholder, the placeholder retains all the history of the location throughout the life of the plant, no matter which asset was disposed at the location. This enables an analyst to determine whether or not any detected problems are caused by the location (such as soft foot, or some other asset close by) rather than by the asset itself.

Associating data with the physical asset also provides several benefits. As the asset is moved from one location in the plant to another, it retains all of its history throughout its lifespan, no matter where the asset has been located. This enables an analyst to determine whether or not any detected problems were caused by some defect in the asset itself or were related to the position in the plant where the asset was placed.

Associating data with the monitoring device also provides several benefits. As the monitoring device is bound to various locations over time, it retains all its history throughout its life, no matter which asset it is monitoring at the location. This enables an analyst to determine whether or not any detected problems are a result of the monitoring device (such as out of calibration) rather than the asset being monitored.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:
1. An asset data collection and management system comprising:
 a plurality of physical assets disposed at a plurality of physical locations in a plant, each physical asset assigned a unique asset identifier;

a plurality of monitoring devices for collecting sets of asset data that are indicative of operational performance of the plurality of physical assets;

a communication network to which the plurality of monitoring devices are connected;

an asset data management computer in communication with the plurality of monitoring devices via the communication network, the asset data management computer for receiving the sets of asset data and for executing instructions that:

generate a plurality of location placeholders that are each associated with a unique one of the plurality of physical locations in the plant;

associate the unique asset identifiers with corresponding location placeholders, wherein association of a unique asset identifier to a location placeholder indicates that a physical asset to which the unique asset identifier is assigned is disposed at the physical location associated with the location placeholder; and store each of the sets of asset data in association with at least one unique asset identifier and at least one location placeholder, wherein the unique asset identifier identifies the physical asset for which a set of asset data was collected, and wherein the location placeholder is uniquely associated with a physical location at which the set of asset data was collected; and a database in which the sets of asset data are stored, from which all sets of asset data collected at a particular physical location may be accessed, for all physical assets disposed at that particular physical location, and from which all sets of asset data collected for a particular physical asset may be accessed, for all physical locations at which the particular physical asset was disposed.

2. The asset data collection and management system of claim 1 wherein:

each monitoring device is assigned a unique monitoring device identifier;

the asset data management computer executes instructions that bind the unique monitoring device identifiers to corresponding location placeholders, wherein the binding of a unique monitoring device identifier to a location placeholder creates an association between the location placeholder and the unique monitoring device identifier; and all sets of asset data collected using a particular monitoring device may be accessed from the database, for all physical assets for which the particular monitoring device collected asset data, and at all physical locations at which the particular monitoring device collected asset data.

3. The asset data collection and management system of claim 1 wherein the plurality of monitoring devices comprise permanently installed monitoring devices or portable handheld monitoring devices or a combination of permanently installed monitoring devices and portable handheld monitoring devices.

4. The asset data collection and management system of claim 1 wherein the plurality of physical assets comprise machines and monitoring devices.

5. The asset data collection and management system of claim 4 further comprising sensors attached to the machines, wherein the monitoring devices collect the sets of asset data based on signals generated by the sensors.

6. The asset data collection and management system of claim 2 wherein the asset data management computer executes instructions that generate graphical representations of an asset inventory hierarchy, a location hierarchy and a network hierarchy on a display device, wherein the asset inventory hierarchy comprises a hierarchal display of graphical representations of the physical assets, the location hierarchy comprises a hierarchal display of the physical locations in the plant in which physical assets are located, including graphical representations of the location placeholders associated with the physical locations, and the network hierarchy comprises a hierarchal display of graphical representations of the monitoring devices connected to the communication network, wherein each graphical representation comprises one or more graphical elements, or one or more textual elements, or a combination of one or more graphical elements and one or more textual elements.

7. The asset data collection and management system of claim 6 wherein the asset data management computer executes instructions that associate the unique asset identifier of a particular physical asset with a particular location placeholder based on dragging and dropping the graphical representation of the particular physical asset in the asset inventory hierarchy onto the graphical representation of the particular location placeholder in the location hierarchy.

8. The asset data collection and management system of claim 6 wherein the asset data management computer executes instructions that bind the unique monitoring device identifier of a particular monitoring device with a particular location placeholder based on dragging and dropping the graphical representation of the particular monitoring device in the network hierarchy onto the graphical representation of the particular location placeholder in the location hierarchy.

9. A method for collecting and managing asset data comprising:

(a) assigning a unique asset identifier to each of a plurality of physical assets disposed at a plurality of physical locations in a plant;

(b) connecting a plurality of monitoring devices to a communication network, the monitoring devices for collecting sets of asset data indicative of operational performance of the plurality of physical assets;

(c) generating a plurality of location placeholders, wherein each location placeholder is associated with a unique one of the plurality of physical locations in the plant;

(d) associating the unique asset identifiers with corresponding location placeholders, wherein association of a unique asset identifier to a location placeholder indicates that a physical asset to which the unique asset identifier is assigned is disposed at the physical location associated with the location placeholder;

(e) storing each of the sets of asset data in association with at least one of the unique asset identifiers and at least one of the location placeholders, wherein the unique asset identifier identifies the physical asset for which a set of asset data was collected, and wherein the location placeholder is uniquely associated with a physical location at which the set of asset data was collected;

(f) providing access to all sets of asset data collected at a particular physical location, for all physical assets disposed at that particular physical location; and (g) providing access to all sets of asset data collected for a particular physical asset, for all physical locations at which the particular physical asset was disposed.

10. The method of claim 9 further comprising:
(h) assigning a unique monitoring device identifier to each of the plurality of monitoring devices;
(i) binding the unique monitoring device identifiers to corresponding location placeholders, wherein the binding of a unique monitoring device identifier to a location placeholder creates an association between the location placeholder and the unique monitoring device identifier;
(j) storing each of the sets of asset data in association with at least one of the unique monitoring device identifiers that uniquely identifies a monitoring device that collected the set of asset data;
step (f) further comprising providing access to all sets of asset data collected at a particular physical location, for all physical assets disposed at that particular physical location, and collected by all monitoring devices used at that particular physical location;
step (g) further comprising providing access to all sets of asset data collected for a particular physical asset, for all physical locations at which the particular physical asset was disposed, and for all monitoring devices that collected data for the particular physical asset; and
(k) providing access to all sets of asset data collected using a particular monitoring device, for all physical assets for which the particular monitoring device collected asset data, and at all physical locations at which the particular monitoring device collected asset data.

11. The method of claim 9 further comprising:
(h) generating a graphical representation of an asset inventory hierarchy comprising a hierarchal display of graphical representations of the physical assets; and
(i) generating a graphical representation of a location hierarchy comprising a hierarchal display of the physical locations in the plant in which physical assets are located, including graphical representations of the location placeholders associated with the physical locations,
wherein each graphical representation comprises one or more graphical elements, or one or more textual elements, or a combination of one or more graphical elements and one or more textual elements.

12. The method of claim 11 wherein the step (d) of associating the unique asset identifier of a particular physical asset with a particular location placeholder is based on dragging and dropping the graphical representation of the particular physical asset in the asset inventory hierarchy onto the graphical representation of the particular location placeholder in the location hierarchy.

13. The method of claim 10 further comprising:
(l) generating a graphical representation of a location hierarchy comprising a hierarchal display of the physical locations in the plant in which physical assets are located, including graphical representations of the location placeholders associated with the physical locations; and
(m) generating a graphical representation of a network hierarchy comprising a hierarchal display of graphical representations of the monitoring devices connected to the communication network,
wherein each graphical representation comprises one or more graphical elements, or one or more textual elements, or a combination of one or more graphical elements and one or more textual elements.

14. The method of claim 13 wherein the step (i) of binding the unique monitoring device identifier of a particular monitoring device with a particular location placeholder is based on dragging and dropping the graphical representation of the particular monitoring device in the network hierarchy onto the graphical representation of the particular location placeholder in the location hierarchy.

15. A system for collecting and managing sets of asset data that are indicative of operational performance of a plurality of physical assets disposed at a plurality of physical locations in a plant, wherein a unique asset identifier is assigned to each of the plurality of physical assets, wherein the sets of asset data are collected by a plurality of monitoring devices that are each assigned a unique monitoring device identifier, the system comprising:
an asset data management computer in communication with the plurality of monitoring devices via a communication network, the asset data management computer for receiving the sets of asset data and for executing instructions that:
generate a plurality of location placeholders, wherein each location placeholder is associated with a unique one of the plurality of physical locations in the plant;
associate the unique asset identifiers with corresponding location placeholders, wherein association of a unique asset identifier to a location placeholder indicates that a physical asset to which the unique asset identifier is assigned is disposed at the physical location associated with the location placeholder;
bind the unique monitoring device identifiers to corresponding location placeholders, wherein the binding of a unique monitoring device identifier to a location placeholder creates an association between the location placeholder and the unique monitoring device identifier; and
store each of the sets of asset data in association with at least one unique asset identifier, at least one location placeholder, and at least one unique monitoring device identifier, wherein the unique asset identifier identifies the physical asset for which a set of asset data was collected, wherein the location placeholder is uniquely associated with a physical location at which the set of asset data was collected, and the unique monitoring device identifier uniquely identifies a monitoring device that collected the set of asset data; and
a database in which the sets of asset data are stored,
from which all sets of asset data collected at a particular physical location may be accessed, for all physical assets disposed at that particular physical location, and collected by all monitoring devices used at that particular physical location,
from which all sets of asset data collected for a particular physical asset may be accessed, for all physical locations at which the particular physical asset was disposed, and for all monitoring devices that collected data for the particular physical asset, and
from which all sets of asset data collected using a particular monitoring device may be accessed, for all physical assets for which the particular monitoring device collected asset data, and at all physical locations at which the particular monitoring device collected asset data.

16. The system of claim 15 wherein the asset data management computer executes instructions that generate graphical representations of an asset inventory hierarchy, a location hierarchy and a network hierarchy on a display device, wherein
the asset inventory hierarchy comprises a hierarchal display of graphical representations of the physical assets, the location hierarchy comprises a hierarchal display of the physical locations in the plant in which physical assets are located, including graphical representations of the location placeholders associated with the physical locations, and the network hierarchy comprises a hierarchal display of graphical representations of the monitoring devices connected to the communication network, wherein each graphical representation comprises one or more graphical elements, or one or more textual elements, or a combination of one or more graphical elements and one or more textual elements.

17. The system of claim 15 wherein the asset data management computer executes instructions that associate the unique asset identifier of a particular physical asset with a particular location placeholder based on dragging and dropping the graphical representation of the particular physical asset in the asset inventory hierarchy onto the graphical representation of the particular location placeholder in the location hierarchy.

18. The system of claim 15 wherein the asset data management computer executes instructions that bind the unique monitoring device identifier of a particular monitoring device with a particular location placeholder based on dragging and dropping the graphical representation of the particular monitoring device in the network hierarchy onto the graphical representation of the particular location placeholder in the location hierarchy.

* * * * *